United States Patent
Xue et al.

(10) Patent No.: US 11,013,385 B2
(45) Date of Patent: May 25, 2021

(54) AUTOMATIC CLEANING DEVICE AND CLEANING METHOD

(71) Applicants: XIAOMI INC., Bejing (CN); BEIJING ROCKROBO TECHNOLOGY CO., LTD., Beijing (CN)

(72) Inventors: Yingnan Xue, Beijing (CN); Yongfeng Xia, Beijing (CN)

(73) Assignees: Xiaomi Inc., Beijing (CN); Beijing Rockrobo Technology Co., Ltd., Beijing (CN)

( * ) Notice: Subject to any disclaimer, the term of this patent is extended or adjusted under 35 U.S.C. 154(b) by 337 days.

(21) Appl. No.: 16/009,977

(22) Filed: Jun. 15, 2018

(65) Prior Publication Data

US 2018/0289228 A1 Oct. 11, 2018

Related U.S. Application Data

(63) Continuation of application No. PCT/CN2016/108935, filed on Dec. 7, 2016.

(30) Foreign Application Priority Data

Dec. 16, 2015 (CN) .......................... 201521054625.2

(51) Int. Cl.
  *A47L 9/28* (2006.01)
  *G05D 1/02* (2020.01)
(52) U.S. Cl.
  CPC .................. *A47L 9/28* (2013.01); *G05D 1/02* (2013.01); *A47L 2201/04* (2013.01)
(58) Field of Classification Search
  CPC ...... A47L 9/28; A47L 2201/04; A47L 9/2805; A47L 9/2852; G05D 1/02; G05D 1/024; G05D 1/0274; G01S 17/08
  See application file for complete search history.

(56) References Cited

U.S. PATENT DOCUMENTS

| 6,481,515 B1 * | 11/2002 | Kirkpatrick ............. A47L 11/03 180/65.1 |
| 2009/0055020 A1 * | 2/2009 | Jeong ................... G05D 1/0272 700/251 |

(Continued)

FOREIGN PATENT DOCUMENTS

| CN | 201573208 U | 9/2010 |
| CN | 102053623 A | 5/2011 |

(Continued)

OTHER PUBLICATIONS

International Search Report and Written Opinion of PCT/CN2016/108935 dated Mar. 1, 2017 including English translations, 24 pages.

(Continued)

*Primary Examiner* — Mohammad K Islam
(74) *Attorney, Agent, or Firm* — Arch & Lake LLP (57) ABSTRACT

An automatic cleaning device includes: a sensor system for collecting a pre-set environment parameter of surroundings of the automatic cleaning device; and an application processor. The application processor includes a central processing unit electrically coupled to the sensor system to acquire the pre-set environment parameter collected by the sensor system. The application processor further includes a graphic processing unit electrically coupled to the central processing unit. The graphic processing unit obtains the pre-set environment parameter from the central processing unit and then generates a map of the surroundings of the automatic cleaning device based on the pre-set environment parameter.

20 Claims, 7 Drawing Sheets

(56) References Cited

U.S. PATENT DOCUMENTS

| | | | |
|---|---|---|---|
| 2009/0125175 A1* | 5/2009 | Park | G05D 1/024 |
| | | | 701/28 |
| 2011/0264305 A1 | 10/2011 | Choe et al. | |
| 2012/0106829 A1 | 5/2012 | Lee | |
| 2013/0024025 A1* | 1/2013 | Hsu | G05D 1/0274 |
| | | | 700/259 |
| 2014/0005933 A1 | 1/2014 | Fong et al. | |
| 2014/0188325 A1 | 7/2014 | Johnson | |
| 2015/0012128 A1 | 1/2015 | Rebstock | |
| 2015/0020299 A1 | 1/2015 | Hsu | |
| 2015/0310620 A1 | 10/2015 | Aviv et al. | |
| 2016/0101524 A1* | 4/2016 | Noh | G06K 9/2036 |
| | | | 382/153 |
| 2016/0132056 A1* | 5/2016 | Yoshino | G01S 17/88 |
| | | | 701/23 |
| 2016/0363930 A1* | 12/2016 | Kwak | G05D 1/0033 |
| 2018/0217611 A1* | 8/2018 | Kim | A47L 9/2852 |

FOREIGN PATENT DOCUMENTS

| | | |
|---|---|---|
| CN | 102283616 A | 12/2011 |
| CN | 103048996 A | 4/2013 |
| CN | 104302218 A | 1/2015 |
| CN | 106256124 A | 12/2016 |
| EP | 2330471 A2 | 6/2011 |
| EP | 2381328 A2 | 10/2011 |
| EP | 2450762 A2 | 5/2012 |
| EP | 3135033 A1 | 3/2017 |
| JP | 2011233149 A | 11/2011 |
| JP | 2017511468 A | 4/2017 |
| KR | 1020110046213 A | 5/2011 |
| KR | 10-20110119118 A | 11/2011 |
| KR | 10-20120047137 A | 5/2012 |
| KR | 10-20160127057 A | 11/2016 |
| WO | 2015163995 A1 | 10/2015 |

OTHER PUBLICATIONS

Extended European search report issued in corresponding European Application No. 16874778.0, dated Mar. 7, 2019, 9 pages.

Second Office Action of Eurasia Patent Application No. 201891263, from the EAPO, dated Jul. 28, 2020, (2p).

Notice of Dismissal of Amendment of Korean Application No. 10-2018-7015795, from the KIPO dated Jul. 23, 2020, with English translation, (10p).

First Office Action of Korean Patent Application No. 10-2018-7015795, from the Korean Patent Office, dated May 22, 2019 (8p).

English Translation of First Office Action of Korean Patent Application No. 10-2018-7015795, from the Korean Patent Office, dated May 22, 2019 (7p).

First Office Action of Japanese Patent Application No. 2018-528748, from the Japanese Patent Office, dated Jun. 18, 2019 and English translation (6p).

\* cited by examiner

AUTOMATIC CLEANING DEVICE AND CLEANING METHOD

CROSS REFERENCE TO RELATED APPLICATIONS

This application is a continuation of International Application No. PCT/CN2016/108935, filed Dec. 7, 2016, which is based on and claims priority to Chinese Patent Application No. 201521054625.2, filed Dec. 16, 2015, which is incorporated herein by reference in its entirety.

TECHNICAL FIELD

The present disclosure relates to the field of automatic cleaning technology, and in particular to an automatic cleaning device and a cleaning method.

BACKGROUND

In the related art, a variety of automatic cleaning devices such as automatic sweeping robots and automatic mopping robots may perform a variety of cleaning operations automatically, which brings convenience to users. An automatic cleaning device needs to generate a real-time map of the surrounding environment of the automatic cleaning device, in order to perform cleaning operations automatically.

However, since the processing capability of the automatic cleaning device is limited, the working efficiency of the automatic cleaning device is usually reduced due to the low speed of map generation.

SUMMARY

The present disclosure provides an automatic cleaning device which can solves the disadvantages of the related art.

According to a first aspect of the present disclosure, an automatic cleaning device is provided and includes: a sensor system configured to collect a pre-set environment parameter of surroundings of the automatic cleaning device; and an application processor. The application processor includes a central processing unit electrically coupled to the sensor system; the central processing unit is configured to acquire the pre-set environment parameter collected by the sensor system. The application processor further includes a graphic processing unit electrically coupled to the central processing unit; and the graphic processing unit is configured to obtain the pre-set environment parameter from the central processing unit and then generate a map of the surroundings of the automatic cleaning device based on the pre-set environment parameter.

According to a second aspect of the present disclosure, a cleaning method for an automatic cleaning device is provided and includes: a data acquisition step of using a sensor system to collect a pre-set environment parameter of surroundings of the automatic cleaning device; a data pre-processing step of using a pre-processing unit to pre-process the pre-set environment parameter and provide the pre-set environment parameter after pre-processing to a central processing unit; and a data processing step of providing, by the central processing unit, the pre-set environment parameter after pre-processing to a graphic processing unit and generating, by the graphic processing unit, map data of the surroundings of the automatic cleaning device based on the pre-set environment parameter after pre-processing.

According to a third aspect of the present disclosure, a control system for an automatic cleaning device is provided and includes: a central processing unit, a graphic processing unit, a sensor system and a pre-processing unit. The central processing unit, the graphic processing unit, the sensor system and the pre-processing unit are connected through a communication bus. The sensor system is configured to collect a pre-set environment parameter of surroundings of the automatic cleaning device; the central processing unit is configured to acquire the pre-set environment parameter collected by the sensor system; and the graphic processing unit is configured to obtain the pre-set environment parameter from the central processing unit and then generate a map of the surroundings of the automatic cleaning device based on the pre-set environment parameter.

According to a fourth aspect of the present disclosure, a mobile electronic device is provided and includes: a communication connection establishment module configured to establish a communication connection between the mobile electronic device and the above automatic cleaning device; a position instruction sending module configured to send a position information request instruction to the automatic cleaning device; a position receiving module configured to receive position information returned by the automatic cleaning device once every preset time, wherein the position information includes a real-time position of the automatic cleaning device; and a display module configured to display the position information on an in interactive interface of the mobile electronic device.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

Figure 1:
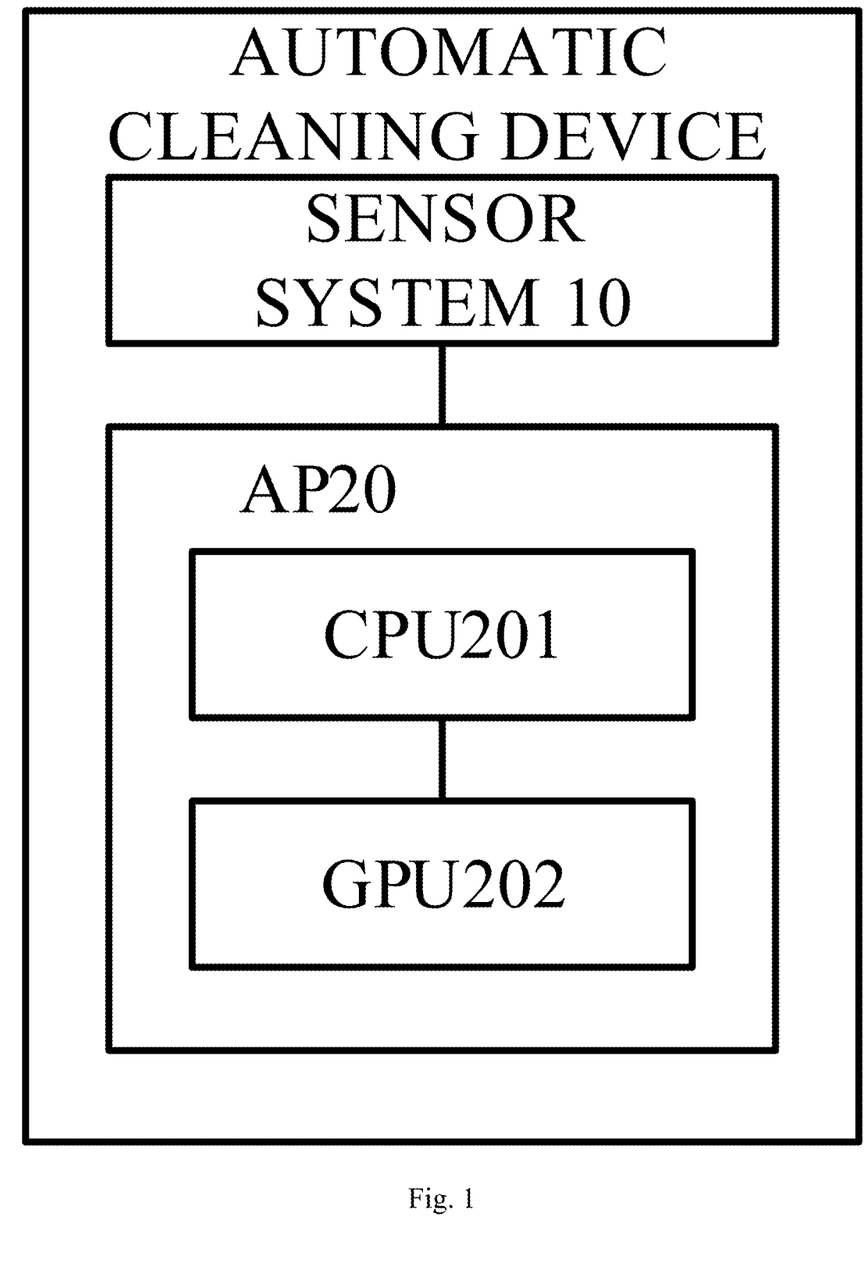
FIG. 1 is a schematic diagram of an automatic cleaning device according to an aspect of the disclosure.

FIG. 1 is a schematic diagram of an automatic cleaning device according to an aspect of the disclosure. As shown in FIG. 1, the automatic cleaning device may include a sensor system 10 and an application processor (AP) 20. The sensor system 10 may include at least one sensor that is used to collect a pre-set environment parameter of surroundings of the automatic cleaning device. The AP 20 may generate a map of the surroundings of the automatic cleaning device by analyzing and processing the pre-set environment parameter, thereby allowing the automatic cleaning device to move and perform operations such as an automatic cleaning operation.

In the automatic cleaning device of the present disclosure, the AP 20 may further include a central processing unit (CPU) 201 and a graphic processing unit (GPU) 202. The CPU 201 is electrically coupled to the sensor system 10 and acquires the above pre-set environment parameter collected by the sensor system 10. The GPU 202 is electrically coupled to the CPU 201, and obtains the above pre-set environment parameter that is acquired by the CPU 201 from the sensor system 10, and then generates the map of the surroundings of the automatic cleaning device based on the pre-set environment parameter.

In this embodiment, compared with the CPU 201, the GPU 202 is more suitable for performing the same calculation for a large amount of data due to structural characteristics of the GPU 202 itself, and the pre-set environment parameter collected by the sensor system 10 is just a large amount of data of the same type. Therefore, by providing both of the CPU 201 and the GPU 202 simultaneously in the AP 20, on the one hand, the GPU 202 can share processing loads with the CPU 201; on the other hand, the structural characteristics and data processing capability of the GPU 202 itself can be fully utilized, thereby accelerating real-time generation of the map and improving the working efficiency of the automatic cleaning device.

1. Data Pre-Processing

Figure 2:
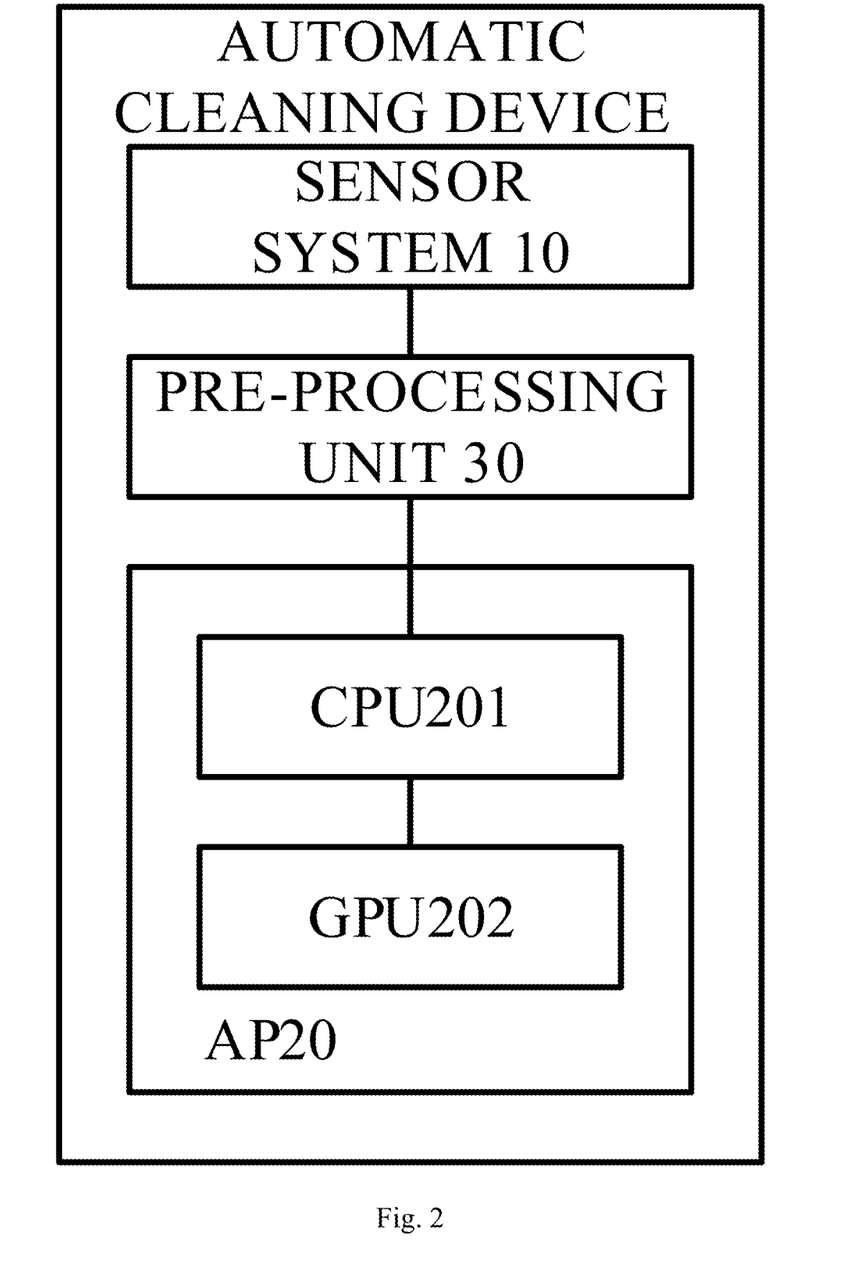
FIG. 2 is a schematic diagram of another automatic cleaning device according to an aspect of the disclosure.

As shown in FIG. 2, the automatic cleaning device may further include a pre-processing unit 30. The pre-processing unit 30 is coupled to the sensor system 10 and the CPU 201 respectively, and is used to pre-process the pre-set environment parameter, thereby allowing the CPU to obtain the pre-set environment parameter after the pre-processing. For example, the pre-processing unit 30 may include a digital signal processor (DSP) which performs the pre-processing on the pre-set environment parameter collected by the sensor system 10, such as data format conversion, integration and cleaning, thereby facilitating the GPU 202 to perform final processing on the pre-set environment parameter.

2. Data Processing

When the GPU generates the map according to the pre-set environment parameter, a variety of ways for calculation and processing may be adopted. Fusion of sensor data may be performed by means of a sensor fusion algorithm. For example, the GPU 202 may locate the automatic cleaning device in a working region and obtains the corresponding map by means of a positioning algorithm based on particle filter. The generation of the map is implemented by means of a fusion algorithm, with multiple sensors based on a common time reference. The utilization of the positioning algorithm based on particle filter in combination with GPU parallel computation solves the problem of positioning accuracy, avoids the local optimal problem, and meanwhile achieves real-time requirements through the parallel computation. Using heuristic search algorithm for path planning can theoretically ensures that the amount of calculation is greatly optimized while searching for the optimal path, so that the path planning can be solved in real time.

Figure 3:
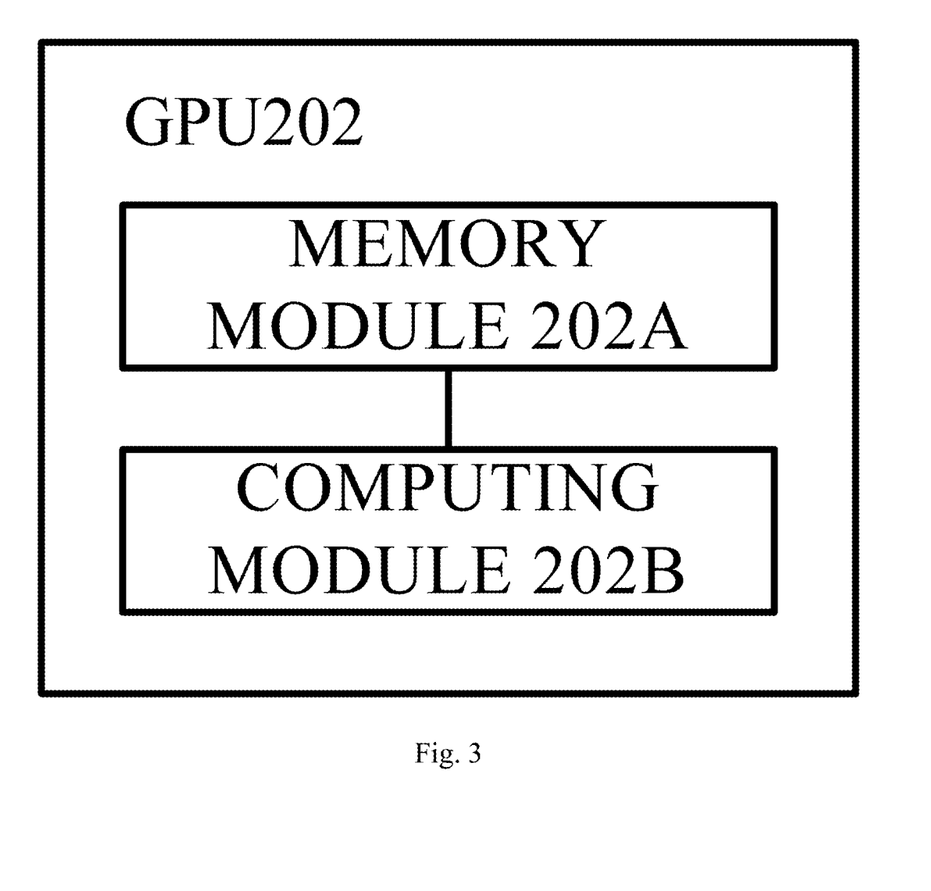
FIG. 3 is a schematic diagram of a GPU according to an aspect of the disclosure.

Accordingly, as shown in FIG. 3, the GPU 202 may include a memory module 202A which stores the positioning algorithm based on particle filter; and a computing module 202B that is coupled to the memory module 202A, calls the positioning algorithm in the memory module 202A, and calculates and processes the pre-set environment parameter based on the positioning algorithm to obtain the map of the surroundings of the automatic cleaning device. Of course, GPU and a random access memory (RAM) may be set separately.

In one example, the GPU rasterizes the working region defined and enclosed by connection lines between light-reflecting points of surrounding objects of the automatic cleaning device, and obtains coordinate values of each intersection point. The GPU calculates a plurality of second angles between a variety of connection lines formed by connecting each intersection point to a variety of reflective points, and the plurality of second angles define a second angle group corresponding to each intersection point, and then stores each second angle group. Here, the sensor system includes a laser ranging device that includes a laser emitter and a receiver. When the automatic cleaning device moves in the working region, a laser emission line emitted by the laser emitter is reflected by surrounding objects to form laser reflection lines, and the laser reflection lines are received by the receiver. The surrounding objects have a light-reverse function that enables the laser reflection line to be parallel with the laser emission line. The receiver is capable of receiving simultaneously multiple laser reflection lines. An angle encoder can measure a plurality of first angles between a head orientation line of the automatic cleaning device and the multiple laser reflection lines. The GPU processes the plurality of first angles to obtain a third angle group of angles between the laser reflection lines. The GPU compares the third angle group with the second angle group to obtain a position of a robot in the coordinate system. In this way, the position of the automatic cleaning device in the map can be determined by the GPU in real time.

3. The Sensor System 10 and the Pre-Set Environment Parameter

A variety of different types of sensor systems 10 may be adopted in the automatic cleaning device, and collected pre-set environment parameters and data processing methods adopted by the GPU 202 may be varied accordingly. For ease of understanding, the technical solutions of the present disclosure will be described hereinafter in conjunction with a sweeping robot as shown in FIG. 4 to FIG. 7.

Figure 4:
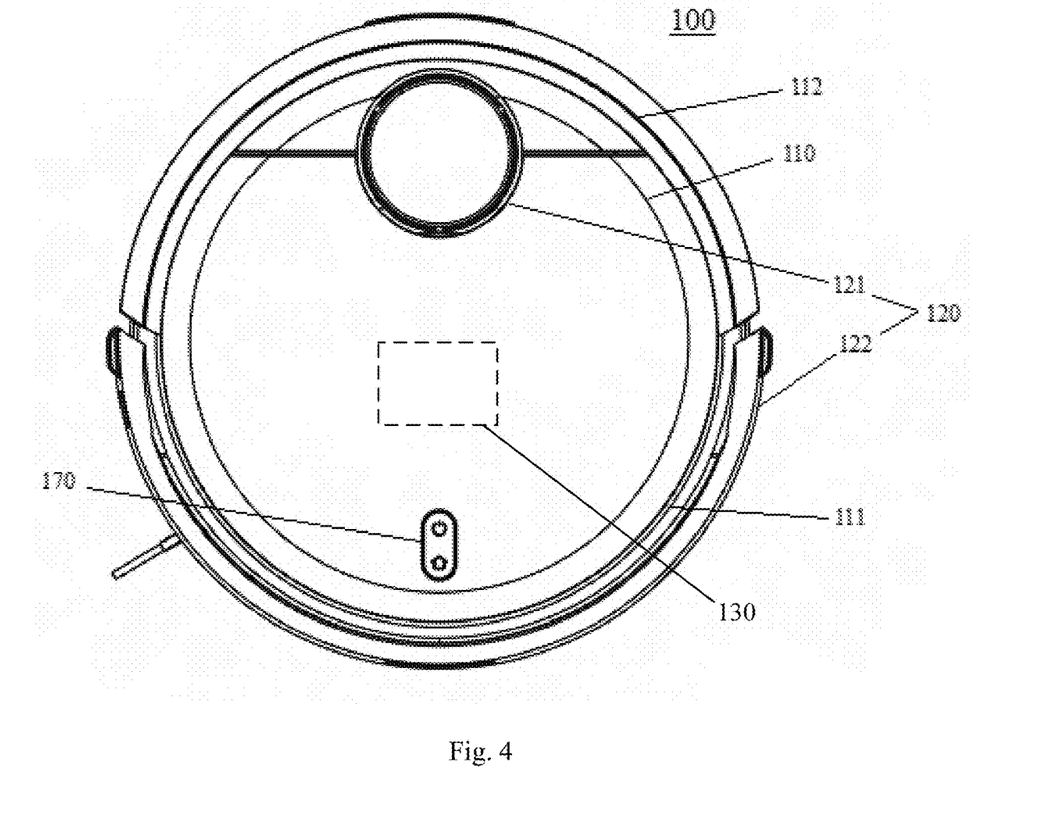
FIG. 4 is a top schematic view of an automatic cleaning device according to an aspect of the disclosure.
Figure 5:
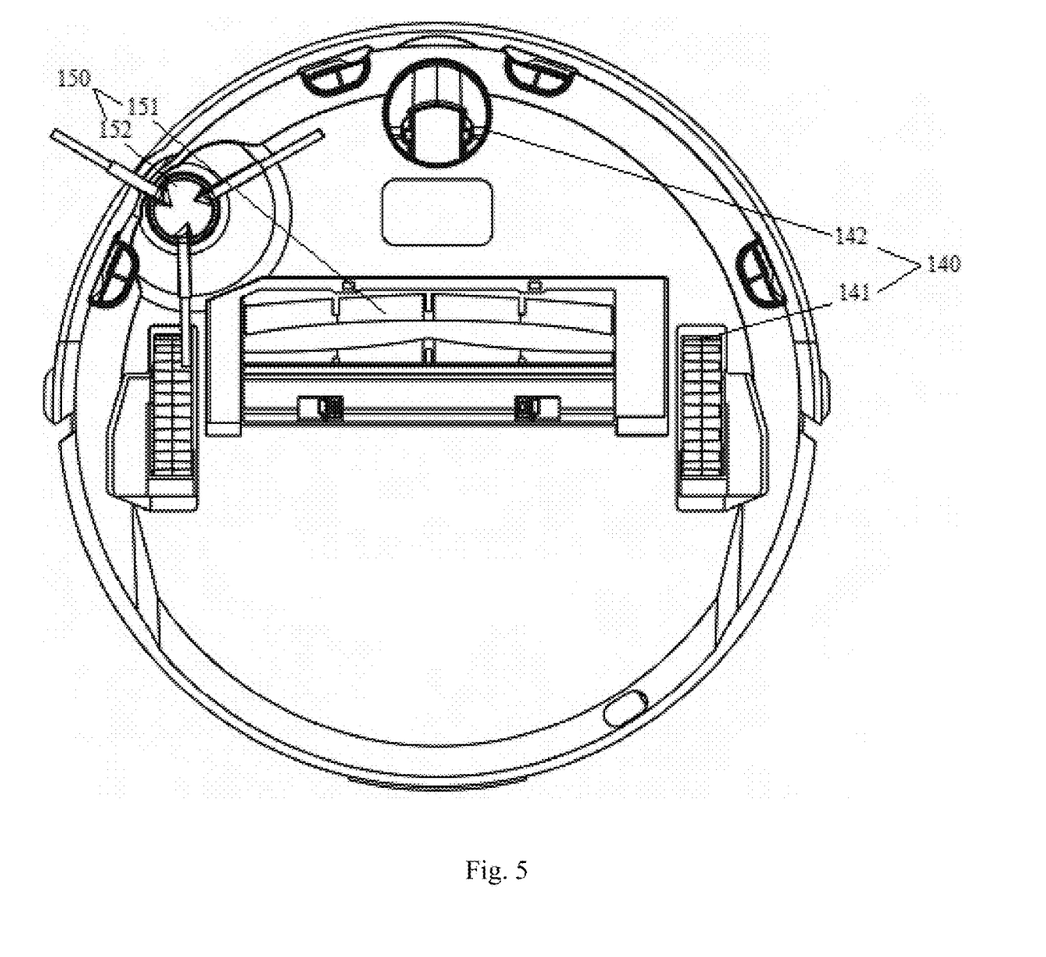
FIG. 5 is a bottom schematic view of an automatic cleaning device according to an aspect of the disclosure.

FIG. 4 is a top schematic view of an automatic cleaning device according to an aspect of the disclosure. In FIG. 4, a sweeping robot 100 includes a robot body 110, a sensor system 120, and a control system 130. FIG. 5 is a bottom schematic view of an automatic cleaning device according to an aspect of the disclosure. In FIG. 5, the sweeping robot 100 includes a drive system 140 and a cleaning system 150 on the bottom surface.

Figure 6:
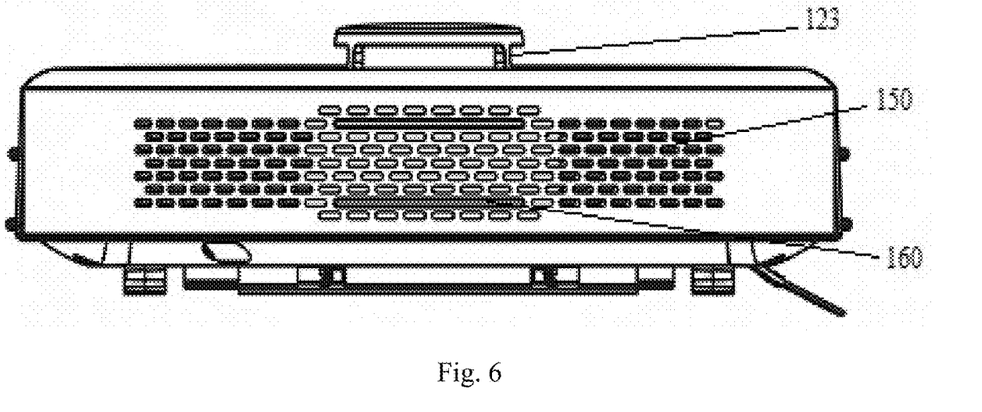
FIG. 6 is a side schematic view of an automatic cleaning device according to an aspect of the disclosure.
Figure 7:
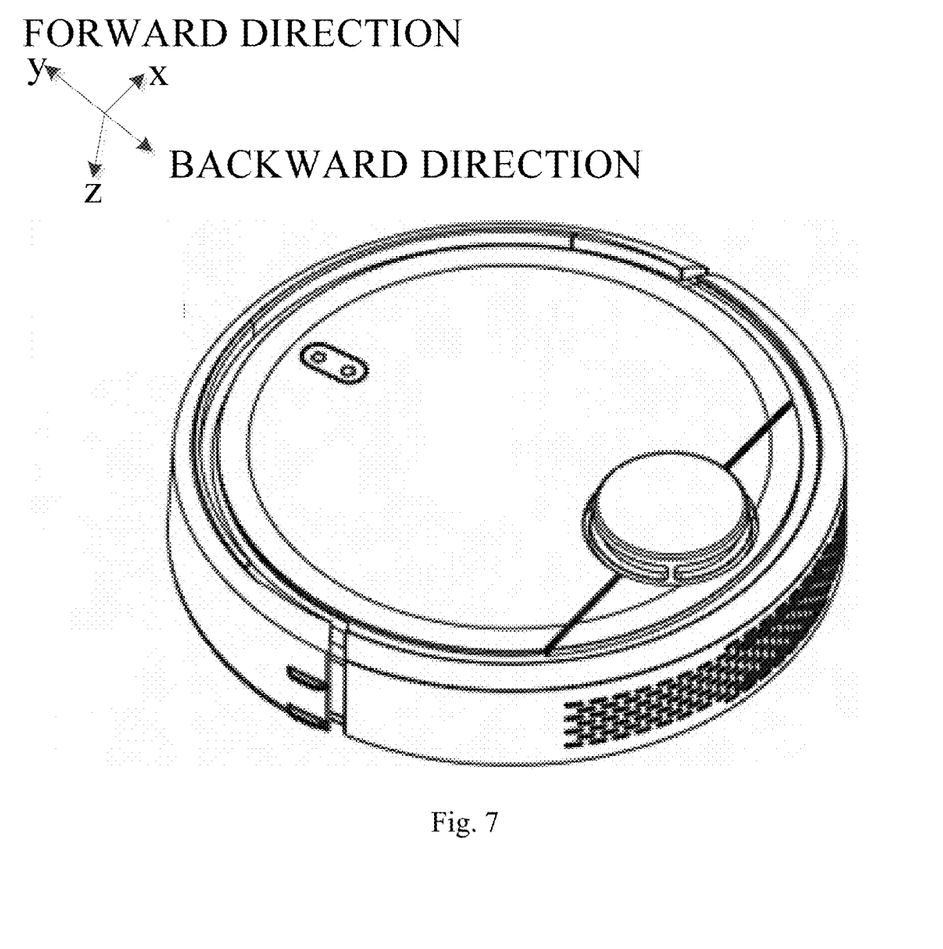
FIG. 7 is another schematic view of an automatic cleaning device according to an aspect of the disclosure.

FIG. 6 is a side schematic view of an automatic cleaning device according to an aspect of the disclosure. In FIG. 6, the sweeping robot 100 includes a cliff sensor 123 on the top, a power supply system 160, and a human-machine interaction system 170. FIG. 7 is another schematic view of an automatic cleaning device according to an aspect of the disclosure As shown in FIG. 4 to FIG. 7, the sweeping robot 100 includes a robot body 110, a sensor system 120, a control system 130, a drive system 140, a cleaning system 150, a power supply system 160 and a human-machine interaction system 170. A person having ordinary skill in the art would appreciate that the sweeping robot 100 is just an example and other types of the automatic cleaning device such as a mopping robot, may adopt the methods and apparatuses in this disclosure to obtain map and plan cleaning path in real time.

The robot body 110 includes a front part 111 and a rear part 112. The robot body 110 may have a nearly circular shape (i.e., the front part and the rear part form segments of the circle respectively). The robot body 110 may also have other shapes, including but not limited to a proximate D-shape, e.g., the front part has a flat outer surface and the outer surface of the rear part forms an arc.

The sensor system 120 includes a position determination device 121 located above the robot body 110, a bumper sensor 122 disposed on the front part 111 of the robot body 110, a cliff sensor 123, an ultrasonic sensor (not shown), an infrared sensor (not shown), a magnetometer (not shown), an accelerometer (not shown), a gyroscope (not shown), an odometer (not shown), and the like. These components of the sensor system 120 provide various position information and motion information to the control system 130. The position determination device 121 includes the sensor system 10 shown in FIG. 1 or FIG. 2. For example, the sensor system 10 may be a camera, a laser ranging device, etc.

1) In one case, the sensor system 10 includes an image acquisition device (i.e., a camera). Here, the pre-set environment parameter collected by the image acquisition device is image data of surrounding objects of the sweeping robot; and then the GPU 202 analyzes and processes the image data of surrounding objects to generate a corresponding map.

2) In another case, the sensor system 10 includes a laser ranging device. Accordingly, distance data between the laser ranging device and surrounding objects, collected by the laser ranging device, is taken as the pre-set environment parameter; and then the GPU 202 analyzes and processes the distance data to generate a corresponding map.

How to determine positions is described hereinafter by taking an example of the laser ranging device based on a triangulation method. The basic principle of the triangulation method is based on uniform scaling relation of similar triangles, and is not elaborated herein.

The laser ranging device includes a light emitter and light receiver. The light emitter may include a light source for emitting light. The light source may include a light emitting component such as a light emitting diode that emits infrared light, visible infrared light or visible light. Preferably, the light source may be a light emitting component that can emit laser beams. In this embodiment, as an example, a laser diode may be taken as the light source. Specifically, due to monochrome, directional and collimated nature of the laser beam, the light source that can emit laser beams can make the measurement more accurate than other light source. For example, compared with the laser beams, the infrared light or visible light emitted by the light emitting diode may be affected by surrounding environment factors (such as color or texture of an object), and then measurement accuracy may be reduced. The laser diode may be a point laser for measuring two-dimensional position information of obstacles, or a line laser for measuring three-dimensional position information within a certain range of obstacles.

The light receiver may include an image sensor. Light spots that are reflected or scattered by obstacles are formed on the image sensor. The image sensor may be a set of pixels in single row or multiple rows. The light receiver can convert light signals into electrical signals. The image sensor may be a complementary metal oxide semiconductor (CMOS) sensor or a charge coupled device (CCD) sensor. Preferably, the complementary metal oxide semiconductor is selected as the image sensor due to its cost advantage. Further, the light receiver may further include a light-receiving lens assembly. Light that is reflected or scattered by obstacles may travel through the light-receiving lens assembly to form an image on the image sensor. The light-receiving lens assembly may include one or more lenses.

A base portion may support the light emitter and the light receiver. The light emitter and the light receiver are disposed on the base portion and are spaced from each other by a certain distance. In order to detect obstacles in the 360-degree directions around the robot, the base portion may be rotatably mounted on the robot body 110, or the base portion itself does not rotate but is provided with a rotation component to enable the light emitter and the light receiver to rotate. A rotation angular velocity of the rotation component may be obtained by means of an optical coupling element and a code disk. The optical coupling element detects missing teeth of the code disk. An instantaneous angular velocity can be obtained by dividing a distance between the missing teeth by a time for sliding over the distance between the missing teeth. The greater the density of the missing teeth in the code disk is, the higher the measurement accuracy and the measurement precision are, but the more precise the structure is, and the higher the amount of calculation is. Reversely, the smaller the density of the missing teeth in the code disk is, the lower the measurement accuracy and the measurement precision are, but the structure is simpler and the amount of calculation is smaller, thereby reducing cost.

A data processing device such as a DSP coupled with the light receiver records distances of obstacles at any angle relative to a 0 degree direction of the robot and sends the distances to the data processing unit of the control system 130 such as the application processor including the CPU. The CPU runs the positioning algorithm based on particle filter to obtain a current position of the robot and then draws a map based on this position for navigation. Preferably, the simultaneous localization and mapping (SLAM) algorithm is used as the positioning algorithm.

The front part 111 of the robot body 110 may bear the bumper sensor 122. When the robot is propelled by a wheel driving module 141 to move on the floor in a cleaning process, the bumper sensor 122 detects one or more events (or objects) in the moving path of the robot 100 by means of the sensor system such as the infrared sensor. The robot 100 is configured to control the wheel driving module 141 to act in response to the events/objects detected by the bumper sensor 1202, such as an obstacle, a wall, and the like, so as to move away from obstacles in the moving path of the robot 100.

The control system 130 is provided on a circuit board in the robot body 110. The control system 130 includes a processor in communication with a non-transitory memory such as a hard disk, a flash memory, a random access memory, etc. For example, the processor is a central processing unit or an application processor. The application processor can implement a positioning algorithm, such as a simultaneous localization and mapping (SLAM) algorithm, to generate a real-time map of the surrounding environment of the robot 100, based on the obstacle information detected and fed back by the laser ranging device. Moreover, by considering the distance information and speed information detected by the bumper sensor 122, the cliff sensor 123, the ultrasonic sensor, the infrared sensor, the magnetometer, the accelerometer, the gyroscope, and the odometer in combination, the application processor can determine the current operation state of the robot 100, such as whether the robot 100 moves across a door threshold, moves on a carpet, moves close to a cliff, gets stuck, has a full dust box, is picked up by a user, or the like. The application processor can also plan the next actions to be performed by the robot 100 based on the current operation state of the robot 100, such that the operations of the robot 100 can meet the user's requirement. Furthermore, the control system 130 can plan a most effective and reasonable cleaning path and/or cleaning mode for the robot, based on the real-time map drawn according to the SLAM algorithm, so as to greatly improve the cleaning efficiency of the robot.

The drive system 140 drives the robot 100 to move on the ground based on a drive command which includes distance and angle information (e.g., x, y, and θ components) of the robot 100. The drive system 140 includes a wheel driving module 141. The wheel driving module 141 may control a left wheel and a right wheel at the same time. The wheel driving module 141 further includes a left wheel driving module and a right wheel driving module for driving the left and right wheels respectively, so as to more precisely control the movement of the robot 100. The left and right wheel driving modules are oppositely arranged along a lateral axis of the robot body 110. To improve the stability and/or maneuverability of the robot 100, the robot 100 further includes one or more non-driving wheels 142, for example, one or more universal wheels. The wheel driving module includes the driving wheel(s), one or more driving motors, and a control circuit for controlling the driving motor(s). The wheel driving module is also connected with the odometer and a circuit for measuring the current supplied to the driving motor(s). The wheel driving module 141 is detachably connected with the robot body 110 for the ease of maintenance or repair. Each driving wheel has an offset drop-down suspension system, through which the driving wheel can be fastened on the robot body 110 and kept movable or rotatable. The driving wheel receives a spring offset extending downward and away from the robot body 110. The spring offset enables the driving wheel to contact with and grip the ground with a non-zero force, and the cleaning components of the robot 100 to maintain contact with the ground with a non-zero pressure.

The cleaning system 150 may include at least one of following systems: a dry cleaning system and a wet cleaning system. As a dry cleaning system, the cleaning system includes a sweeping system 151 for performing the cleaning function of the robot 100. The sweeping system 151 includes a brush roll, a dust box, a fan, an air outlet, and connection elements for connecting the brush roll, dust box, fan, and air outlet. The brush roll forms contact with the ground. Dust on the ground is swept and rolled up by the brush roll to the front of a dust suction inlet located between the brush roll and the dust box, and then sucked into the dust box by a wind which is generated by the fan and which passes through the dust box. The dust suction ability of the robot can be presented by the Dust Pickup Efficiency (DPU). The DPU is determined by many factors, including but not limited to: the structure of the brush roll and the material for making the brush roll; the efficiency of using the wind through the wind path formed by the dust suction inlet, the dust box, the fan, the air outlets, and the connection elements therebetween; and the type and power of the fan. As such, improving the DPU is a complex system design problem. Compared with common wired-powered dust cleaners, improving the DPU has more significance to the robot 100, whose power supply is limited. This is because the improvement of the DPU can directly reduce the energy required by the robot 100 for cleaning the dust in each unit area. For example, with the improvement of the DPU, the area that can be cleaned by a fully charged robot 100 may increase from 80 mm$^2$ to 100 mm$^2$ or more. Moreover, the improvement of the DPU extends the service life of the battery by reducing the frequency of recharging the battery, so that the user does not need to frequently replace the battery. Furthermore, the improvement of the DPU directly affects the user experience, because users can directly judge if the ground swept or mopped by the robot 100 is clean enough. The dry cleaning system further includes a side brush 152. The side brush 152 has a rotation axis forming a non-zero angle with the ground, such that the side brush 152, when rotating, can move debris into the area reachable by the brush roll of the sweeping system 150.

The power supply system 160 includes a rechargeable battery, such as a nickel-metal hydride battery or a lithium battery. The rechargeable battery is connected with a charging control circuit, a charging temperature detection circuit, and a low voltage detection circuit. These circuits are further connected with a single-chip control circuit. The rechargeable battery is charged by connecting a charging electrode on the side or the bottom of the robot body to a charging source. If dust is adhered to an exposed charging electrode, charge accumulation on the charging electrode may be caused, which further causes plastic material around the charging electrode to be melt and deformed, or even the charging electrode itself to be deformed, thereby interrupting normal charging.

The human-machine interaction system 170 includes a user panel which houses various buttons for a user to select function(s). The human-machine interaction system 170 also includes various output devices, such as a display, and/or an indicator light, and/or a speaker, for indicating the current state of the robot or the function(s) selected by the user. The human-machine interaction system 170 further includes a mobile client application. For example, if the robot is capable of path navigation, a mobile client device may display a map of an area surrounding the robot and mark the position of the robot on the map, so as to provide rich and personalized information to the user.

In order to clearly describe the behaviors of the robot, the present disclosure defines three axes with respect to the robot body 110, and the robot 100 can move on the ground along the three axes. The three axes are perpendicular to each other and include: a lateral axis x, a forward-backward axis y, and a vertical axis z. Specifically, the +y direction is defined as the "forward direction", and the -y direction is defined as the "backward direction". The x axis extends between the left wheel and the right wheel of the robot and across the center point of the wheel driving module 141.

The robot 100 can rotate around the x axis. When the front part of the robot 100 tilts upward and the rear part of the robot 100 tilts downward, this movement is defined as "nose up pitch". When the front part of the robot 100 tilts downward and the rear part of the robot 100 tilts upward, the movement is defined as "nose down pitch". In addition, the robot 100 may rotate around the z axis. When the robot 100 moves in the forward direction, a turn of the robot 100 to the right side of the +y direction is defined as a "right turning" of the robot 100 around the z axis to the right side toward the y axis, and a turn of the robot 100 to the left side of the +y direction is defined as a "left turning" of the robot 100 around the z axis.

Optionally, the sensor system includes a laser ranging device; and distance data between the laser ranging device and surrounding objects, collected by the laser ranging device, is taken as the pre-set environment parameter.

Optionally, the laser ranging device includes a point laser emitter; and the point laser emitter obtains the distance data between the laser ranging device and surrounding objects by generating a point laser.

Optionally, the laser ranging device includes a line laser emitter; and the line laser emitter obtains the distance data between the laser ranging device and surrounding objects by generating a line laser.

Optionally, the sensor system includes an image acquisition device; and image data of surrounding objects collected by the image acquisition device is taken as the pre-set environment parameter.

Optionally, the graphic processing unit includes: a memory module configured to store a positioning algorithm based on particle filter; and a computing module coupled to the memory module and configured to call the positioning algorithm and calculate and process the pre-set environment parameter to obtain the map of the surroundings of the automatic cleaning device.

Optionally, the automatic cleaning device further includes a pre-processing unit. The pre-processing unit is coupled to the sensor system and the central processing unit respectively, and is configured to pre-process the pre-set environment parameter, thereby allowing the central processing unit to obtain the pre-set environment parameter after the pre-processing.

Optionally, the pre-processing unit includes a digital signal processor (DSP).

Optionally, the automatic cleaning device is a sweeping robot or a mopping robot.

Optionally, the graphic processing unit includes a memory module and a computing module coupled to the memory module; and the data processing step further includes: calling, by the computing module, a positioning algorithm based on particle filter stored in the memory module, calculating and processing the pre-set environment parameter after pre-processing to obtain the map of the surroundings of the automatic cleaning device.

Optionally, the data acquisition step includes: using a laser ranging device to collect distance data between the laser ranging device and surrounding objects, and taking the distance data collected by the laser ranging device as the pre-set environment parameter.

Optionally, the data acquisition step includes using an image acquisition device to collect image data of surrounding objects, and taking the image data collected by the image acquisition device as the pre-set environment parameter.

Optionally, the mobile electronic device further includes a control instruction sending module configured to send an action request instruction to the automatic cleaning device.

The technical solutions provided in embodiments of the present disclosure can achieve following beneficial effects.

As can be seen from the above embodiments, the application processor of the automatic cleaning device of the present disclosure employs both of the central processing unit and the graphic processing unit cooperating with each other, and thus the graphic processing unit can be dedicated to generating the map of the surroundings of the automatic cleaning device while the central processing unit can be used for other data processing and process control. Since the graphic processing unit undertakes the generation of the map, data processing requirements for the central processing unit can be reduced, thereby enhancing the processing capability and the reaction speed of the automatic cleaning device. In short, the technical solution of the present disclosure can enhance the processing capability and the reaction speed of the automatic cleaning device so as to improve the working efficiency of the automatic cleaning device.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:
1. An automatic cleaning device comprising:
   a sensor system configured to collect an environment parameter of surroundings of the automatic cleaning device; and
   an application processor;
   wherein the application processor includes a central processing unit electrically coupled to the sensor system;

the central processing unit is configured to acquire the environment parameter collected by the sensor system;

the application processor further includes a graphic processing unit electrically coupled to the central processing unit; and the graphic processing unit is configured to obtain the environment parameter from the central processing unit and then generate a map of the surroundings of the automatic cleaning device based on the environment parameter, wherein the map is generated in real-time through parallel computation by the graphic processing unit based on a positioning algorithm.

2. The automatic cleaning device of claim 1, wherein the sensor system comprises a laser ranging device; and distance data between the laser ranging device and surrounding objects, collected by the laser ranging device, is taken as the environment parameter.

3. The automatic cleaning device of claim 2, wherein the laser ranging device comprises a point laser emitter; and the point laser emitter obtains the distance data between the laser ranging device and surrounding objects by generating a point laser.

4. The automatic cleaning device of claim 2, wherein the laser ranging device comprises a line laser emitter; and the line laser emitter obtains the distance data between the laser ranging device and surrounding objects by generating a line laser.

5. The automatic cleaning device of claim 1, wherein the sensor system comprises an image acquisition device; and image data of surrounding objects collected by the image acquisition device is taken as the environment parameter.

6. The automatic cleaning device of claim 1, wherein the graphic processing unit comprises:
   a memory module configured to store the positioning algorithm based on particle filter; and
   a computing module coupled to the memory module and configured to call the positioning algorithm and calculate and process the environment parameter to obtain the map of the surroundings of the automatic cleaning device.

7. The automatic cleaning device of claim 1, further comprising a pre-processing unit;
   wherein the pre-processing unit is coupled to the sensor system and the central processing unit respectively, and is configured to pre-process the environment parameter, thereby allowing the central processing unit to obtain the environment parameter after the pre-processing.

8. The automatic cleaning device of claim 7, wherein the pre-processing unit comprises a digital signal processor (DSP).

9. The automatic cleaning device of claim 1, wherein the automatic cleaning device is a sweeping robot or a mopping robot.

10. A cleaning method for an automatic cleaning device comprising:
    a data acquisition step of using a sensor system to collect an environment parameter of surroundings of the automatic cleaning device;
    a data pre-processing step of using a pre-processing unit to pre-process the environment parameter and provide the environment parameter after pre-processing to a central processing unit; and
    a data processing step of providing, by the central processing unit, the environment parameter after pre-processing to a graphic processing unit and generating, by the graphic processing unit, map data of the surroundings of the automatic cleaning device based on the pre-set environment parameter after pre-processing, wherein the map is generated in real-time through parallel computation by the graphic processing unit based on a positioning algorithm.

11. The method of claim 10, wherein the graphic processing unit comprises a memory module and a computing module coupled to the memory module; and the data processing step further comprises:
    calling, by the computing module, the positioning algorithm based on particle filter stored in the memory module, calculating and processing the environment parameter after pre-processing to obtain the map of the surroundings of the automatic cleaning device.

12. The method of claim 10, wherein the data acquisition step comprises: using a laser ranging device to collect distance data between the laser ranging device and surrounding objects.

13. The method of claim 12, wherein the data acquisition step comprises: taking the distance data collected by the laser ranging device as the environment parameter.

14. The method of claim 10, wherein the data acquisition step comprises: using an image acquisition device to collect image data of surrounding objects, and taking the image data collected by the image acquisition device as the environment parameter.

15. The method of claim 11, wherein the data acquisition step comprises: using an image acquisition device to collect image data of surrounding objects, and taking the image data collected by the image acquisition device as the environment parameter.

16. A control system for an automatic cleaning device comprising:
    a central processing unit;
    a graphic processing unit;
    a sensor system; and
    a pre-processing unit;
    wherein the central processing unit, the graphic processing unit, the sensor system and the
    pre-processing unit are connected through a communication bus; the sensor system is configured to collect a environment parameter of surroundings of the automatic cleaning device; the central processing unit is configured to acquire the environment parameter collected by the sensor system; and the graphic processing unit is configured to obtain the environment parameter from the central processing unit and then generate a map of the surroundings of the automatic cleaning device based on the environment parameter, wherein the map is generated in real-time through parallel computation by the graphic processing unit based on a positioning algorithm.

17. The control system of claim 16, wherein the sensor system comprises a laser ranging device; and distance data between the laser ranging device and surrounding objects, collected by the laser ranging device, is taken as the environment parameter.

18. The control system of claim 17, wherein the laser ranging device comprises a point laser emitter; and the point laser emitter obtains the distance data between the laser ranging device and surrounding objects by generating a point laser.

19. The control system of claim 17, wherein the laser ranging device comprises a line laser emitter; and the line laser emitter obtains the distance data between the laser ranging device and surrounding objects by generating a line laser.

20. The control system of claim 16, wherein the sensor system comprises an image acquisition device; and image data of surrounding objects collected by the image acquisition device is taken as the environment parameter.

\* \* \* \* \*